United States Patent
Kitzmiller

(10) Patent No.: US 8,080,295 B2
(45) Date of Patent: Dec. 20, 2011

(54) PLASTIC ARTICLE

(75) Inventor: Michael Charles Kitzmiller, Ft. Loramie, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 300 days.

(21) Appl. No.: 11/801,397

(22) Filed: May 9, 2007

(65) Prior Publication Data

US 2007/0259145 A1   Nov. 8, 2007

Related U.S. Application Data

(63) Continuation of application No. 10/994,445, filed on Nov. 22, 2004, now abandoned.

(51) Int. Cl.
*B32B 1/08* (2006.01)
*B32B 27/08* (2006.01)
*B32B 27/32* (2006.01)
*B65D 81/00* (2006.01)
*B65D 23/10* (2006.01)
*B65D 1/40* (2006.01)

(52) U.S. Cl. ............... 428/35.7; 428/36.8; 428/36.9; 428/36.91; 428/36.92; 220/62.22; 220/755

(58) Field of Classification Search ........... 220/767, 220/768, 769, 62.11, 62.22, 600, 604, 608, 220/660, 669, 732, 752, 755; 428/34.1, 35.2, 428/35.4, 35.5, 35.7, 36.6, 36.7, 36.8, 36.9, 428/36.91, 36.92
See application file for complete search history.

(56) References Cited

U.S. PATENT DOCUMENTS

| | | | |
|---|---|---|---|
| 3,257,482 A | 6/1966 | Schechter | |
| 4,016,995 A | 4/1977 | Frazer | |
| 5,219,419 A * | 6/1993 | Prothe | 206/515 |
| 6,006,952 A | 12/1999 | Lucas | |
| 6,077,579 A * | 6/2000 | De Laforcade | 428/35.7 |
| 6,319,454 B1 | 11/2001 | Nakagawa et al. | |
| 6,610,382 B1 * | 8/2003 | Kobe et al. | 428/119 |
| 6,974,051 B1 * | 12/2005 | Lin | 222/25 |
| 7,578,414 B2 * | 8/2009 | Sellars et al. | 221/65 |

FOREIGN PATENT DOCUMENTS

| | | |
|---|---|---|
| DE | 29921877 U1 | 3/2000 |
| EP | 1216821 A1 | 6/2002 |
| GB | 2041286 A | 10/1980 |
| WO | 2005003576 A1 | 4/2005 |

OTHER PUBLICATIONS

European Patent Office; Supplementary European Search Report, issued in corresponding European application No. 05754659.0; Dated: Jun. 10, 2010; Date mailed: Jun. 22, 2010.

* cited by examiner

*Primary Examiner* — Walter B Aughenbaugh
(74) *Attorney, Agent, or Firm* — Dykema Gossett PLLC

(57) ABSTRACT

A hollow plastic article having a wall with an inside wall portion and an outside wall portion, wherein a part of the outside wall portion has a slip resistant, tactile surface relative to the remainder of the outside wall portion to provide an improved gripping surface on the article.

17 Claims, 6 Drawing Sheets

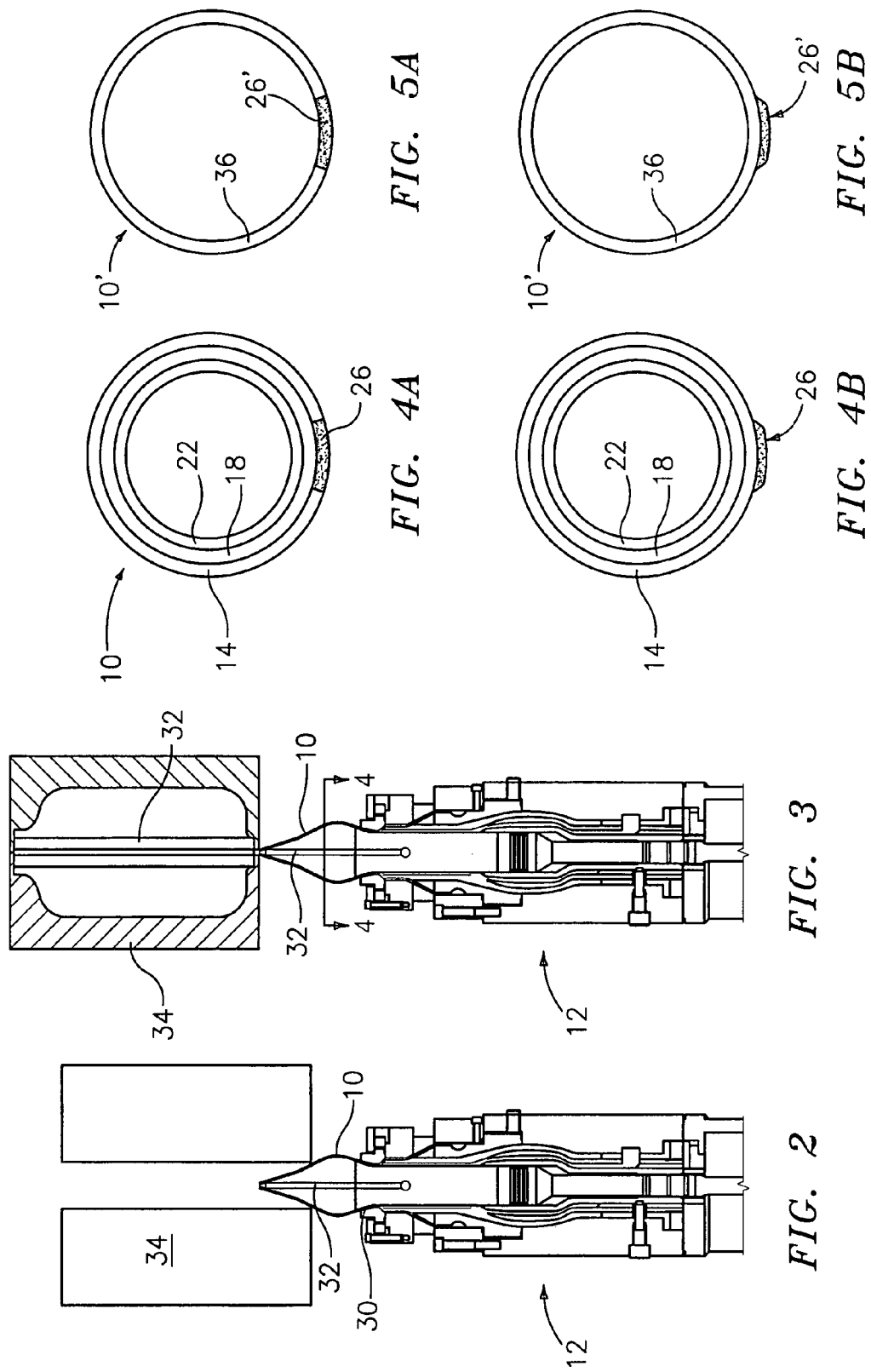

PLASTIC ARTICLE

CROSS-REFERENCE TO RELATED APPLICATION

This application is a continuation of U.S. patent application Ser. No. 10/994,445, filed Nov. 22, 2004, now abandoned.

BACKGROUND OF THE INVENTION

Hollow plastic articles are widely used commercially, and the handling of these articles is an important consideration in the use thereof. A hollow plastic article would be considerably enhanced if a portion thereof, as for example, in the handle area of an article with a handle, is provided with an improved tactile area, as a slip resistant surface.

It would be particularly desirable if the slip resistant surface was localized in an area to be handled by the user and if such an article could be prepared in a cost effective manner. Desirably, article performance characteristics should not be impacted by the slip resistant surface, and for bottles or containers the slip resistant surface should advantageously have a low impact on production and filling lines. Further, it would be desirable to be able to provide such an article while maintaining recyclability and to avoid high manufacturing costs in its preparation.

Thus, a conveniently prepared and inexpensive hollow plastic article with a portion thereof having an improved grip area with slip resistance would considerably enhance the commercial desirability of such an article and provide the user with a highly desirable no-slip feature.

Accordingly, it is an object of the present invention to provide a hollow plastic article wherein a part of the outside wall portion thereof has a slip resistant surface relative to the remainder of the outside wall.

It is a further object of the present invention to provide an article as aforesaid which is a hollow plastic container which is an extruded, blow molded container.

Further objects and advantages of the present invention will appear hereinbelow.

SUMMARY OF THE INVENTION

In accordance with the present invention the foregoing objects and advantages are readily obtained.

The present invention comprises a hollow plastic article having a wall with an inside wall portion and an outside wall portion, wherein a part of the outside wall portion has a slip resistant surface relative to the remainder of the outside wall portion to provide an improved gripping surface on said article. Thus, the slip resistant surface desirably has an increased coefficient of friction relative to the remainder of the outside wall portion. Alternatively, the slip resistant surface desirably has a hardness rating lower than a Shore Durometer D60.

The slip resistant surface is preferably in the form of a stripe on the outside wall portion of the article, but may also be a discrete portion on the outside wall portion of the article. In a preferred embodiment the article is a plastic container that includes a handle and the handle includes the slip resistant surface. Preferably the entire handle includes the slip resistant surface. This greatly facilitates ease of handling.

The plastic article may be a mono-layer plastic article wherein the slip resistant surface is part of the mono-layer. In a preferred embodiment the article is a multi-layer plastic article having at least two layers and the slip resistant surface is a part of the outer layer.

The plastic article is desirably an extruded, blow molded plastic article and the slip resistant surface is desirably a thermoplastic elastomer. It is also desirable to provide the slip resistant surface with a contrasting color with respect to the remainder of the outside wall portion. Alternatively, one can provide at least two spaced apart slip resistant surfaces on the article.

The slip resistant surface should desirably be a material which is compatible with the remainder of the plastic article for recycling. In preferred embodiments the article is a co-extruded, multi-layered plastic container and the slip resistant surface is a tactile surface which is part of the outer layer or which is extruded onto the outer layer and which provides an improved gripping area on the container. In a further preferred embodiment the slip resistant surface is a thermoplastic elastomer and the remainder of the outside wall portion is a polyolefin which is compatible with the material of the slip resistant surface for recycling.

Further features of the present invention will appear hereinbelow.

BRIEF DESCRIPTION OF THE DRAWINGS

The present invention will be more readily understandable from a consideration of the following illustrative drawings, wherein:

FIGS. 2-3 are sectional views of an illustrative apparatus of FIG. 1 for co-extruding a parison or preform into a blow mold for forming an extruded, blow molded plastic article in accordance with the present invention;

FIGS. 4A-4B are sectional views along lines 4-4 of FIG. 3 showing a multi-layer parison or preform for forming a multi-layer plastic article in accordance with the present invention;

FIGS. 5A-5B are sectional views similar to FIGS. 4A-4B showing a mono-layer parison or preform for forming a mono-layer plastic article in accordance with the present invention.

DETAILED DESCRIPTION OF PREFERRED EMBODIMENTS

In accordance with the preferred embodiment of the present invention a preform or parison is formed by extruding or injecting or co-extruding or co-injecting and subsequently blow molding to form a hollow plastic article. The parison and the hollow plastic article are characterized by a part of the outside wall having a slip resistant or softer touch surface relative to the remainder of the outside wall to provide an improved gripping surface.

The preform or parison and article can be multi-layer or mono-layer, with the slip resistant portion on a portion of the outside wall portion thereof. If desired, the slip resistant portion can have a color different from the remainder of the article. In a preferred embodiment a plastic article with a handle will have at least a portion of the handle having the slip resistant surface. Alternatively, the hollow article can have at least two spaced apart, slip resistant surfaces. Desirably, the slip resistant surface is a material which is compatible with the remainder of the plastic article for recycling.

Thus, in accordance with the present invention the provision of a slip resistant surface on a part of the outside wall, which if desired may extend completely through the article wall or be extruded onto the outside wall, provides a highly advantageous, improved gripping surface without impacting the remainder of the article and enables the preparation of same in a simple and convenient manner.

Figure 1:
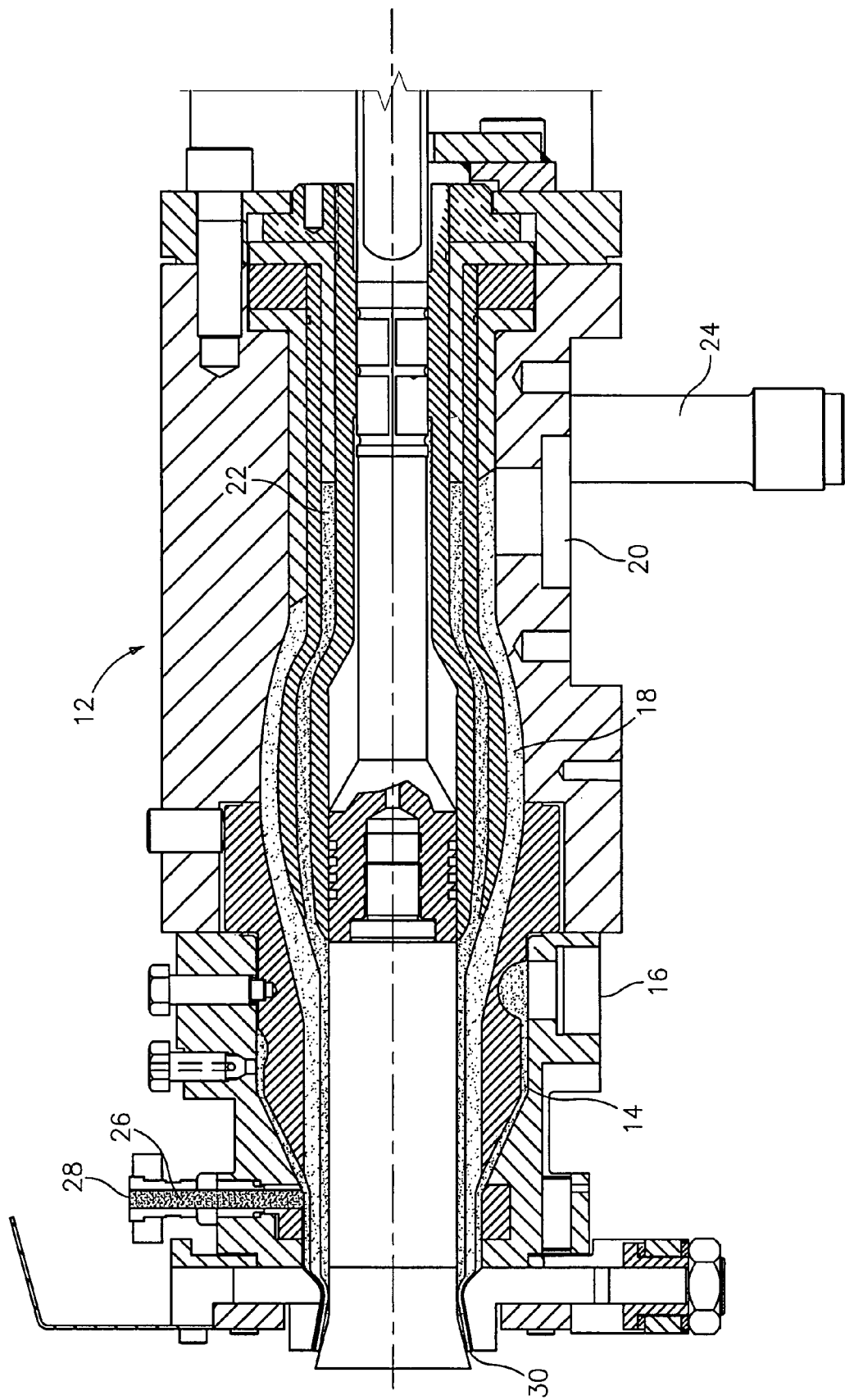
FIG. 1 is a sectional view of an illustrative apparatus for forming a parison or preform in accordance with the present invention.

Thus, referring to FIGS. 1-3, these show a representative apparatus and process for preparing the hollow plastic article of the present invention.

A preform 10 is formed by co-extruding the desired layer or layers in extruder 12. In the embodiment shown in FIGS. 1-3, a three layer preform or parison is formed, with the outer plastic layer 14 injected into extruder 12 through outer layer entry 16, the middle layer 18 injected into extruder 12 through middle layer entry 20 and inner layer 22 injected into extruder 12 through inner layer entry 24. The slip resistant plastic material 26 comprising the slip resistant surface is injected into the extruder 12 at slip resistant material entry 28, which is downstream of outer layer entry 16, middle layer entry 20 and inner layer entry 24. The slip resistant material 26 is preferably a thermoplastic elastomer which is extruded onto the outer layer surface. A flow control mechanism phases the entry of the slip resistant material or turns the entry on and off to localize the vertical position of the material 26 on the parison wall and to provide desired positioning of same on the final, blow molded article. Representative articles will be discussed below showing representative locations of the slip resistant material.

Extruder 12 exit 30 is shown in FIG. 1, with co-extruded parison 10 shown in FIG. 2 having a thermoplastic elastomer stripe 32 which is the slip resistant surface extending along the outside thereof. The parison 10 enters blow mold 34 which closes on the parison as shown in FIG. 3 to form the desired blow molded article in the shape of the blow mold.

FIG. 4A shows a sectional view of parison 10 showing inner layer 22, middle layer 18 and outer layer 14 with slip resistant material 26 forming a part of the outer layer 14, and FIG. 4B shows slip resistant material 26 extruded onto or layered on outer layer 14. FIG. 5A shows a mono-layer parison 10' in a sectional view similar to FIG. 4A for forming a mono-layer hollow plastic article in accordance with the present invention. The mono-layer article 10' has a single layer with the major portion of the single layer being a first plastic material 36 and slip resistant material 26' forming a part of the single layer and extending completely through the article wall, with article 10' formed by extrusion in a manner after the formation of a parison 10. FIG. 5B shows slip resistant material 26' extruded onto or layered on single layer 36. Naturally, the multi-layer parison can have two or more layers, or a mono-layer parison can be used as desired.

Figure 6A:
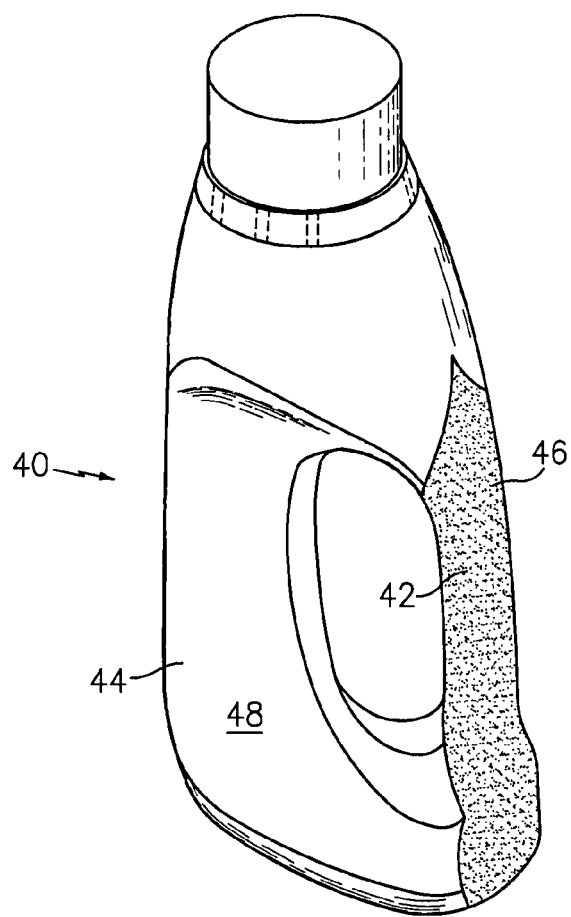
FIGS. 6-9 are representative extruded, blow molded plastic articles of the present invention.
Figure 6B:
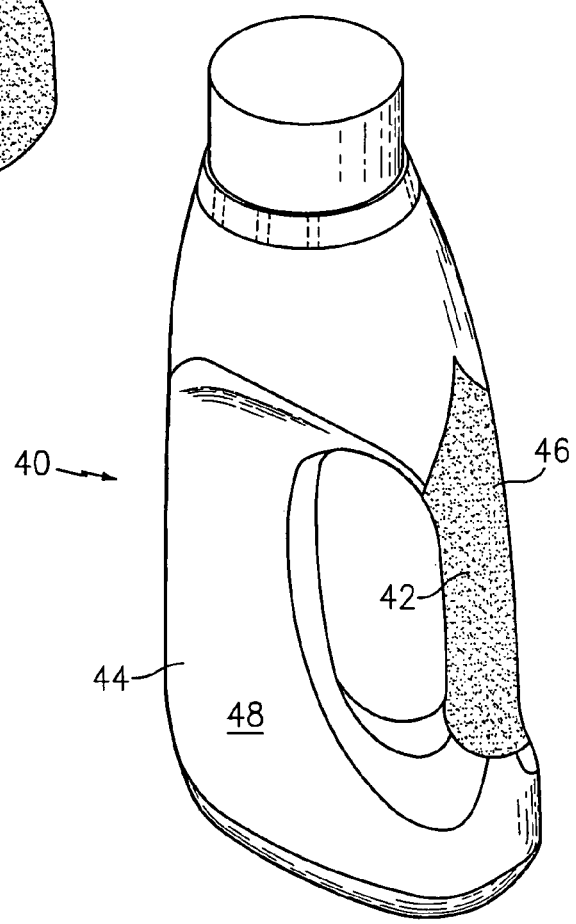

FIGS. 6A-6B shows a perspective view of a representative hollow plastic container 40 of the present invention having a handle 42 and an outside wall portion 44. At least a portion of the handle 42 includes a slip resistant surface 46 and 46A which provides an improved gripping surface relative to the remainder 48 of the outside wall portion. This advantageously provides an improved gripping area on the handle 42.

Figure 7B:
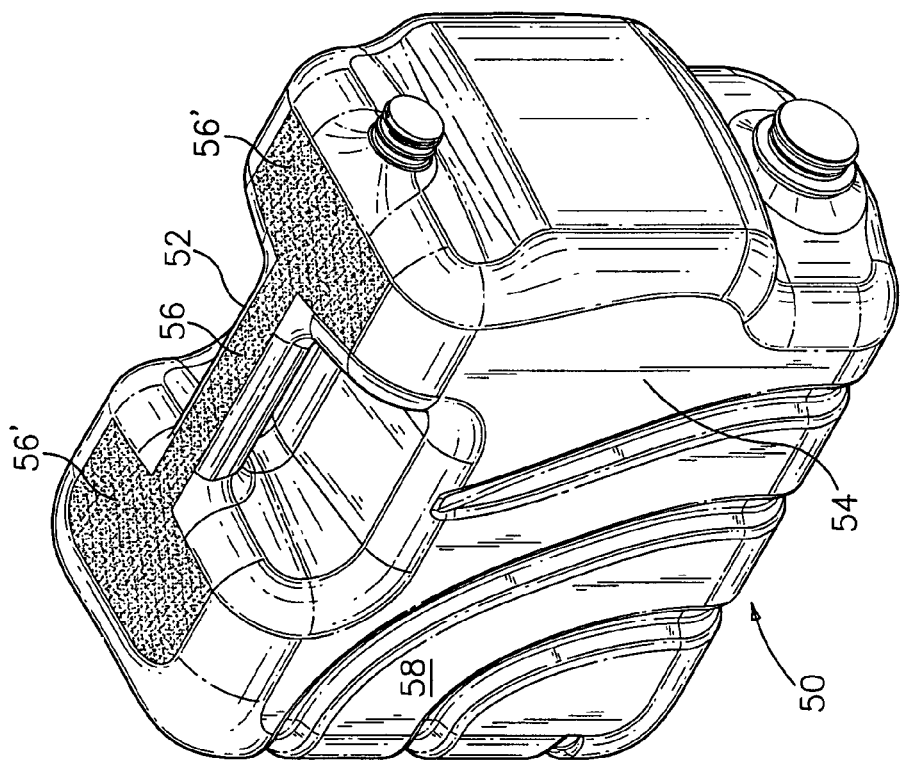
Figure 7A:
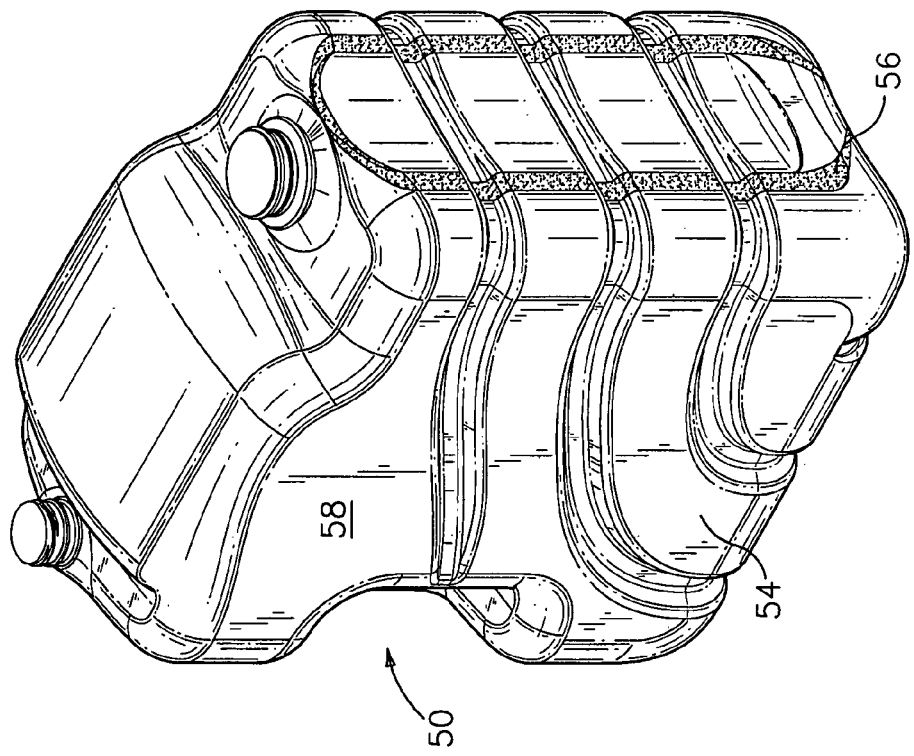

FIGS. 7A and 7B show perspective views of an alternate embodiment of the hollow plastic article of the present invention. Plastic container 50 includes a handle 52 and an outside wall portion 54. The slip resistant surface 56 is located on the handle and discrete portions 56' adjacent thereto and on the wall opposed to the handle which provides at least two (2) spaced apart slip resistant surfaces relative to the remainder 58 of the outside wall portion. This provides two, spaced slip resistant gripping surfaces which is particularly desirable on a large container.

Figure 8B:
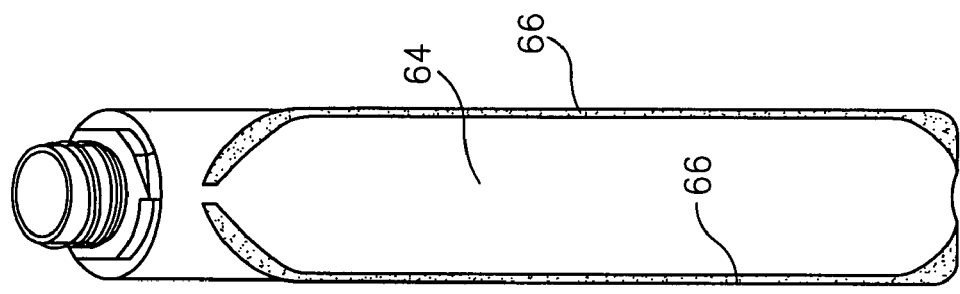
Figure 8A:
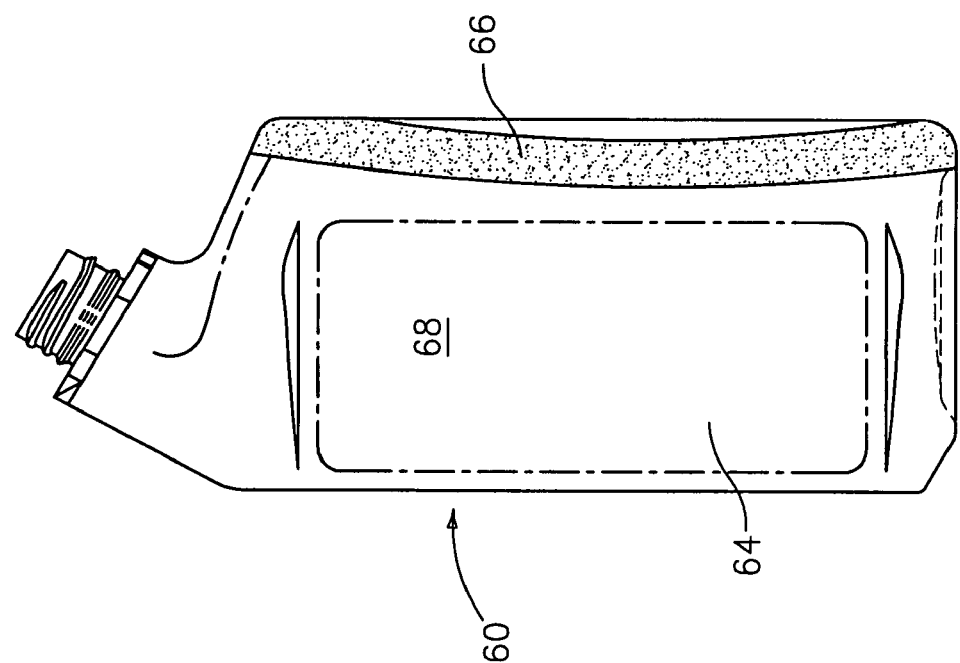

FIGS. 8A and 8B show a still further embodiment of the hollow plastic article of the present invention, with FIG. 8A showing a side view and FIG. 8B showing a rear view. Plastic container 60 includes an outside wall portion 64 and a slip resistant surface 66 in the form of circular channels adjacent one end of the container which provide slip resistant channels relative to the remainder 68 of the outside wall portion. This provides a conveniently located slip resistant area.

Figure 9B:
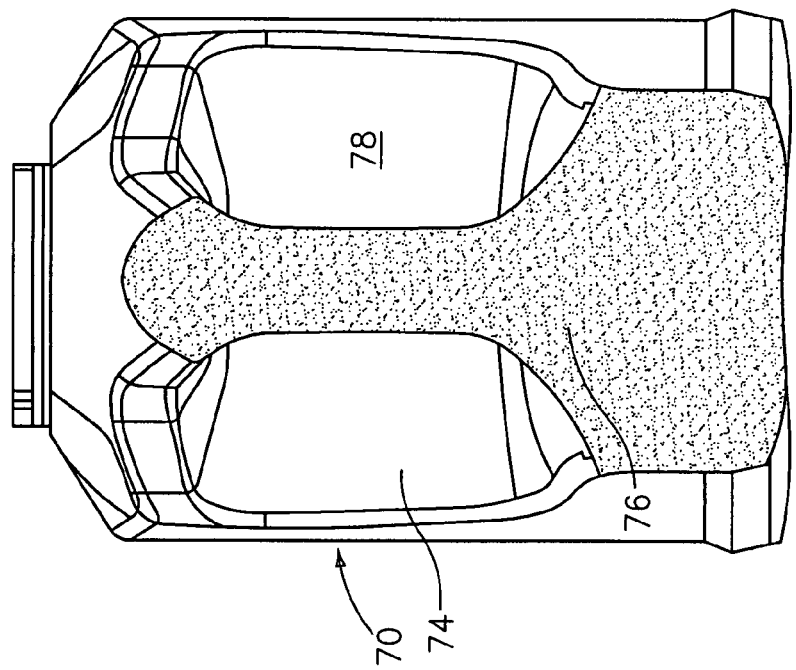
Figure 9A:
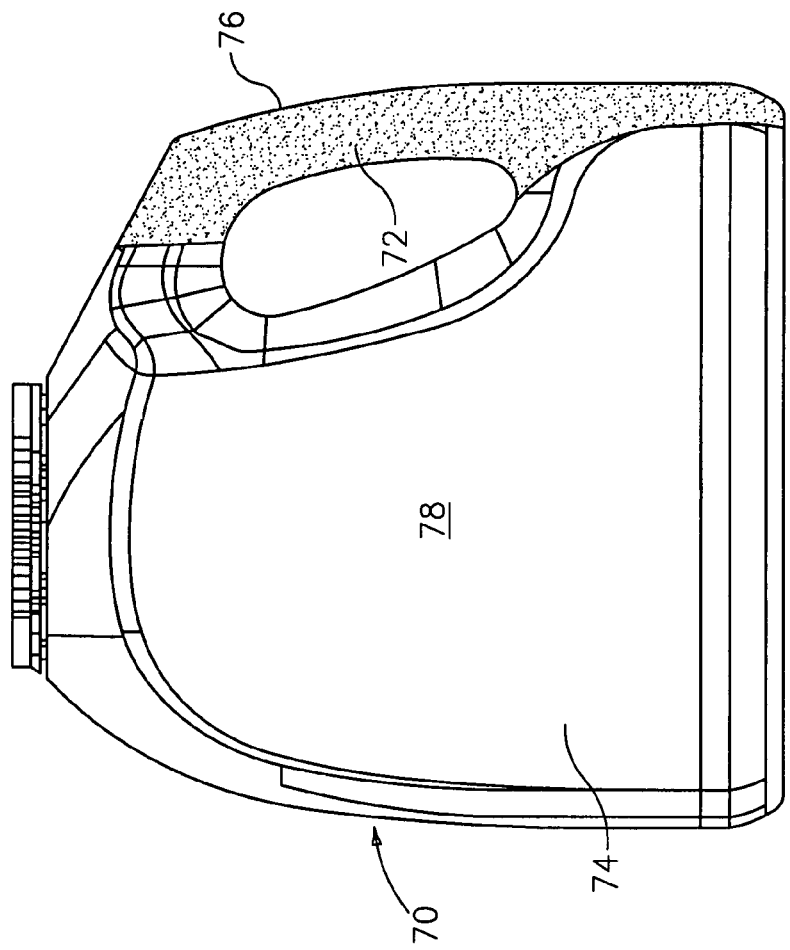

FIGS. 9A and 9B show a still further embodiment of the hollow plastic article of the present invention, with FIG. 9A showing a side view and FIG. 9B showing a rear view. Plastic container 70 includes a handle 72 and an outside wall portion 74 with a slip resistant surface 76 relative to the remainder 78 of the outside wall portion. As clearly shown in the drawings, the entire handle 72 is covered with the slip resistant surface, which facilitates handling of the container.

The slip resistant material should desirably have an increased coefficient of friction relative to the remainder of the outside wall portion, and preferably has a hardness rating lower than a Shore Durometer of D60. The material selected should have a tactile surface which provides improved handling relative to the remainder of the container. Preferably, the slip resistant material will be compatible with the remainder of the article for recycling.

Preferred slip resistant materials are thermoplastic elastomers, such as styrenics, as styrene-ethylene-butylene copolymers, or thermoplastic polyolefin elastomers. In addition, one can use the following materials:

thermoplastic vulcanizates,
thermoplastic urethane elastomers,
copolyester thermoplastic elastomers, and
copolyamide thermoplastic elastomers.

The remainder of the article can be polyethylene, polypropylene or polyolefins generally or polyethylene terephthalate, or a polycarbonates, or acrylics or phenolics, or polyvinyl chloride.

While a preferred embodiment of a co-extruded blow molded article has been described, the articles of the present invention may also be made by other methods, such as a simple extruded plastic article, or an injection molded or injection molded—blow molded article.

While a stripe-type slip resistant surface is a preferred embodiment, one can use discrete slip resistant surfaces or spaced surfaces. The present invention can provide a slip resistant surface on a focus area or areas as desired for convenient handling. Moreover, the article of the present invention is readily prepared on a commercial scale and a reasonable cost and provides an improved article.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A hollow plastic article, which comprises:
   a hollow blow molded plastic article having a wall with an inside wall portion and an outside wall portion, said outside wall portion including a body portion and a handle portion; wherein a part of the outside wall portion has a blow molded slip resistant surface with increased coefficient of friction relative to the remainder of the outside wall portion to provide an improved gripping surface on said article, the blow molded slip resistant surface blow molded with the blow molding of the outside wall portion of the wall of the container;

wherein the handle portion is blow molded and hollow, ends of the handle portion connect to the body portion at two vertically spaced portions of the body portion, and the handle portion is spaced from the body portion to provide a horizontally-extending pass through area that is beneath at least a portion of the handle and is between a portion of the handle and an adjacent portion of the body portion, said pass through area comprising an open portion extending horizontally from one side of the handle completely through to the opposing side of the handle, said handle having a handle outerside surface and a handle underside surface spaced from the article body portion, and wherein said slip resistant surface extends over the handle outerside surface and at least in part over the handle underside surface to permit one to grasp the handle slip resistant surface on the handle outerside surface and underside surface.

2. An article according to claim 1 wherein said slip resistant surface has a hardness rating lower than a Shore Durometer of D60.

3. An article according to claim 1, wherein substantially the entire handle outerside surface is covered with said slip resistant surface.

4. An article according to claim 1, wherein said article is a multi-layer plastic article having at least two layers, and said slip resistant surface is a part of the outer layer thereof.

5. An article according to claim 1, wherein said slip resistant surface is a thermoplastic elastomer.

6. An article according to claim 1, wherein, excepting the slip resistant surface, said article is a mono-layer plastic article, and said slip resistant surface is molded with said mono-layer.

7. An article according to claim 1, wherein said slip resistant surface has a contrasting color with respect to the remainder of the outside wall portion.

8. An article according to claim 1, including at least two spaced apart slip resistant surfaces.

9. An article according to claim 1, wherein said article is a plastic container.

10. An article according to claim 1, wherein said slip resistant surface is a material which is compatible with the remainder of the plastic article for recycling.

11. An article according to claim 4, wherein said article is a co-extruded or co-injected, blow molded plastic container, and wherein said slip resistant surface is a tactile surface on the outside of said container which provides an improved gripping area.

12. An article according to claim 5, wherein the remainder of the outside wall portion is a polyolefin.

13. An article according to claim 1, wherein the slip resistant surface extends completely through the article wall.

14. An article according to claim 1, wherein the slip resistant surface is extruded onto the outside wall portion.

15. An article according to claim 1, wherein said slip resistant surface has a softer touch than the remainder of the outside wall portion.

16. An article according to claim 1, wherein the slip resistant surface covers the entire handle outerside surface and handle underside surface.

17. An article according to claim 1, including additional portions of slip resistant surface on the body portion.

* * * * *